(No Model.)
2 Sheets—Sheet 1.
B. F. BERGH.
CAR BRAKE AND STARTER.
No. 315,704. Patented Apr. 14, 1885.
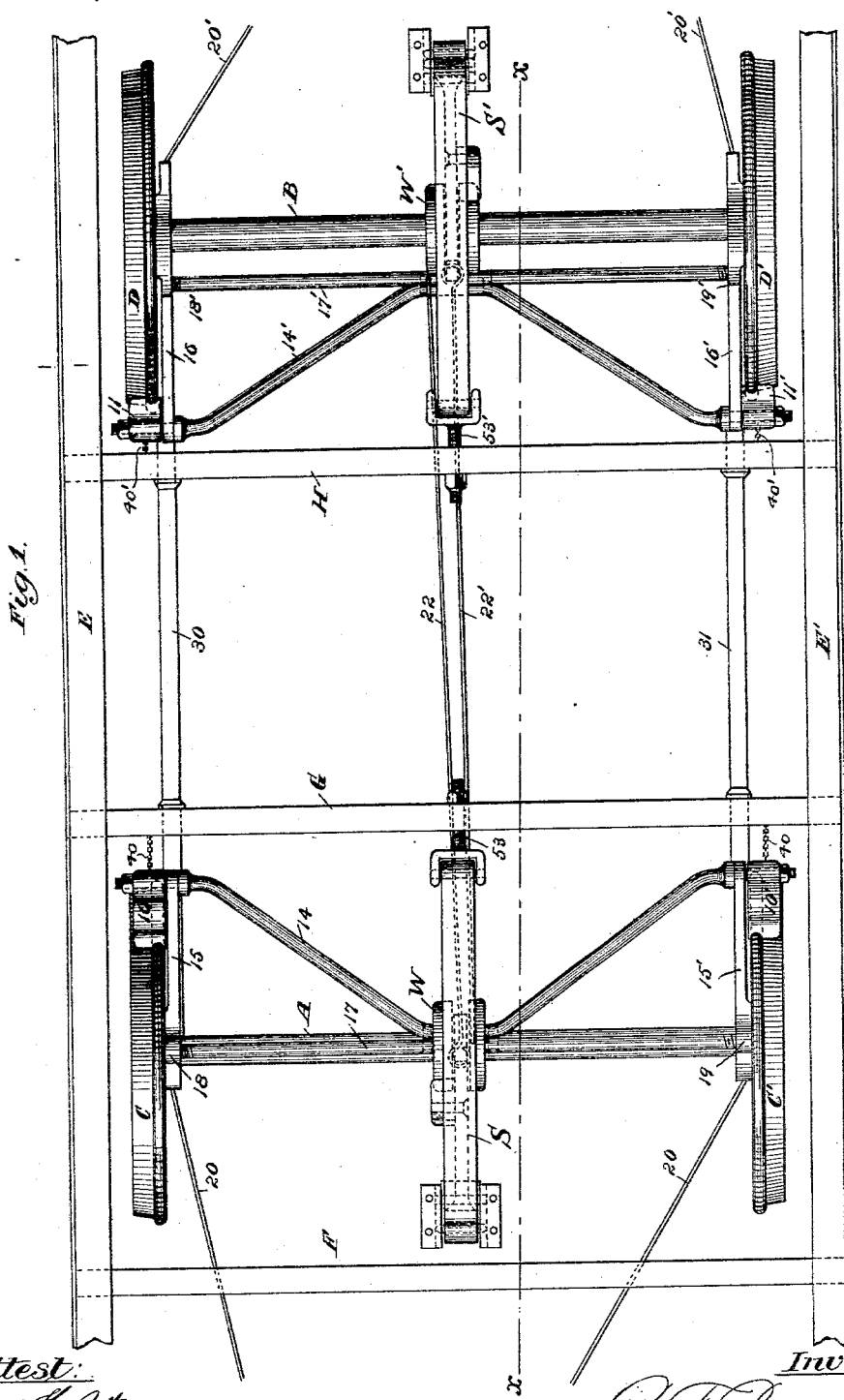

(No Model.) 2 Sheets—Sheet 2.
B. F. BERGH.
CAR BRAKE AND STARTER.
No. 315,704. Patented Apr. 14, 1885.
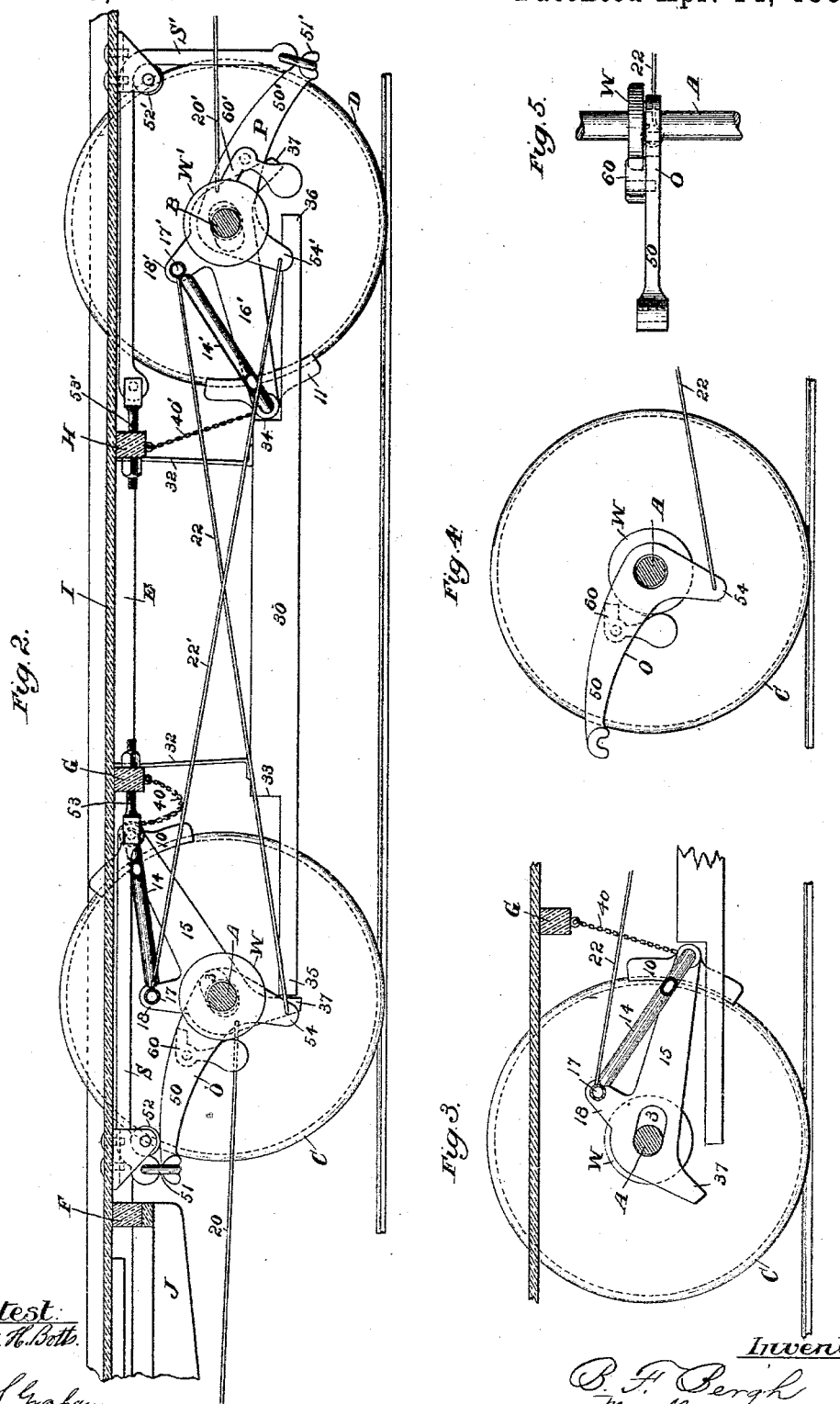
Attest:
George H. Botts.
Geo. H. Graham.
Inventor:
B. F. Bergh
By Munson & Philipp
attys

UNITED STATES PATENT OFFICE.

BROR F. BERGH, OF NEW YORK, N. Y.

CAR BRAKE AND STARTER.

SPECIFICATION forming part of Letters Patent No. 315,704, dated April 14, 1885.

Application filed August 20, 1884. (No model.)

*To all whom it may concern:*

Be it known that I, BROR F. BERGH, a citizen of the United States, residing in the city of New York, county of New York, and State of New York, have invented certain new and useful Improvements in Car Brakes and Starters, fully described and represented in the following specification and the accompanying drawings, forming a part of the same.

A practical embodiment of my invention is illustrated in the accompanying drawings, wherein Figure 1 is a plan view of the running-gear of a car with these improvements applied thereto, the flooring of the car being removed to properly expose the parts necessary to explain the invention. Fig. 2 is a a sectional elevation taken on the line $x$ of Fig. 1, the platforms of the car being cut away at either end. Fig. 3 is an elevation of one of the wheels with the brake in its normal position when the wheel runs free. In this figure the brake-lever only is shown. Fig. 4 is an elevation of the same wheel, showing the starting-lever in its normal position. In this view the brake-lever is not shown. Fig. 5 is a plan view of the axle of the wheel shown in Figs. 3 and 4, and illustrates the relation of the starting-lever and its clamping-dog to the friction-wheel carried by said axle.

It is the object of this invention to provide a car with means connected with its brakes whereby the act of applying the brakes to stop the car is utilized to accumulate a starting force that will operate to rotate the wheels of the car when the brakes are set free, and thus start the car from a dead stop independent of any other motor.

Mechanisms having this object in view have been in great variety heretofore proposed or constructed, but owing to their complex character, intricate mechanisms, expensive nature, or impractical structure none have been generally adopted where the act of applying the brakes sets into action the means for accumulating the starting force; but the devices put into use have been such as utilize the first draft movement applied to the car in giving a direct movement to the wheels to cause the latter to roll, and then transfer the draft-power direct to the car-body.

A further object of this invention is, therefore, to attain simplicity of parts, cheapness of construction, and efficiency of operation in the structure and combination of means whereby the brakes, when applied to stop the momentum of the car, are actuated thereby to operate the devices for producing the force that is to be applied to start the car when the brakes are released.

The invention consists in an improved brake-mechanism whereby the brakes are simultaneously applied to the wheels; in an improved structure of brake in connection with one set of wheels and a bell-crank lever and clutch and elastic strap in connection with another set of wheels, whereby the application of the brakes rocks the said bell-crank, stretches the rubber strap, and applies its power in starting the car when the brakes are released, and combinations of the same, all of which is more particularly hereinafter set forth and claimed.

That these improvements may readily be understood, a detailed description of the practical embodiment thereof herein shown will now be given.

The drawings represent an ordinary street-car whose running-gear is composed of two axles, A B, carrying, respectively, wheels C C' and D D' fast thereto. The car-body, of which the sills E E', cross-timbers F G H, floor I, and platform-supports J are in whole or in part shown, is supposed to be mounted upon its axles in the usual manner, such mounting, however, not being shown. The brakes 10 10' in connection with wheels C C', and 11 11' in connection with wheels D D', in place of being hung as is usual, simply vibrate against the periphery of the wheels, being mounted at the ends of brake-arms 15 15' and 16 16', of which the arms 15 15' are sustained upon the axle A, and the arms 16 16' are sustained upon the axle B by means of elongated openings 3, so embracing said axles that the brake-arms may not only move radially to cause the brakes to impinge upon the wheels, but circumferentially, so as to cause the brakes to make part of a circuit with the wheels. These brakes are supported in their normal or unapplied positions, and have their downward movement limited by means of chains 40 40', attached to the ends of their arms 15 15' and 16 16' and to the cross-timbers G H. The pair of brakes 10 10', connected by the brake-arms 15 15' with the axle A, are supported upon a rod, 14, passing through said brakes and their brake-arms, and between the latter said rod is bent at an angle, so as to be united to a brace-rod, 17, that is secured at each end to projections 18 19, extended from the brake-arms near their axle ends. These rods 14 17 are preferably tubular, and together form simply strong and durable means of bracing the brakes and brake-arms, thus enabling the said brakes to make all of their movements in unison and resist the strains to which they are subjected. The brakes 11 11' are mounted in the same manner, as appears from the corresponding parts shown, and respectively marked with like letters of reference primed. The elongated recess 3 in each of the brake-arms permits said arms to be moved radially to draw the brake-shoes into contact with the peripheries of the wheels, to accomplish which movement brake-rods are attached to the axial ends of the brake-arms and connected with the windlass or other means for mechanically or otherwise applying the brakes, one set, 20, of such brake-rods being connected with the brake-arms 15 15', and another set, 20', with the brake-arms 16 16'. When the rods 20 are drawn upon, they operate to powerfully slide the brake-arms 15 15' on the axle A, and thus draw the brake-shoes 10 10' into frictional contact with the peripheries of the wheels C C', and the like movement of the rods 20' will cause the brake-arms 16 16' to slide over the axle B and apply the brake-shoes 11 11' to the wheels D D'. In order, however, that the movement of the brakes in connection with either set of wheels shall cause the brakes in connection with the other set of wheels to be simultaneously operated, brake-bars 30 31 are provided on each side of the car, between the brake-arms 15 16 and 15' 16'. These brake-bars are hung from the timbers G H, or otherwise, to the car-body by means of flexible springs 32, so as to be capable of longitudinal reciprocation. Each of these brake-bars is provided with shoulders 33 34, against which the brake-arms rest when the brakes are in their lowermost position, as in the case of the brake in connection with wheel D in Fig. 2, and the ends 35 36 of these brake-bars are so extended and positioned that they may be engaged by heel-pieces 37, projecting from the brake-arms, when the latter are being moved to their higher positions, as in the case of the wheel C in Fig. 1.

When the brakes are applied at one end of the car—say by the movement of the rods 20—the following operation takes place: The brake-arms 15 15' are simultaneously slid over the axle A, so as to draw the brake-shoes 10 10' into frictional contact with the wheels C C'. Said brake-shoes thereupon adhere to the wheels, and are thereby caused to travel with the wheels, and thus are raised from the position shown in Fig. 3 to that shown in Fig. 2. In this movement the heel-pieces 37 of the brake-arms 15 15' engage the ends 35 of the brake-bars 30 31, and, moving said bars, thereby cause the shoulders 34 thereof to slide the brake-arms 16 16' over the axle B, and thus force the brake-shoes 11 11' into frictional contact with the wheels D D', said brake-shoes being sustained and prevented from taking any downward movement with the wheels D D' by means of the check-chains 40', and thus all of the brake-shoes 10, 10', 11, and 11' are simultaneously applied to their respective wheels, and both sets of wheels have their movement checked. This operation will be performed in the contrary direction by drawing upon the rods 20', as will be apparent.

In order that the momentum of the car may operate, through the medium of the brake mechanism, to produce a power having a force sufficient to start the car from a dead stop, the movement of the brakes circumferentially with the wheels is utilized to produce that power by the following means: The axles A and B are each provided centrally with a bell-crank hung loosely upon them, and the long arms of these bell-crank levers are each connected with a strong rubber strap one end of which is secured to the car-body, and the other ends or short arms of the bell-crank levers are connected with the brake-arms by tie-rods. Thus the axle A is provided centrally with a bell-crank lever, O, the long arm 50 of which lever is connected by a link or tie, 51, with the end of a strong rubber strap, S, that runs over a wooden pulley, 52, and whose opposite end is fastened to the car-body in any suitable manner, as by the stirrup 53 to the timber G. The short arm 54 of the bell-crank lever O is secured by means of a tie-rod, 22, to the brace-rod 17', that connects the brake-arms 16 16' together. Another bell-crank, P, is hung in a similar manner upon the axle B, its long arm 50' being connected by a link or tie, 51', with a strong rubber band, S', that runs over a wooden pulley, 52', and has its opposite end secured to the car-body, as by means of a stirrup, 53', and said bell-crank P has its short arm 54' secured by a tie-rod, 22, with the tie-bar 17, that connects the brake-arms 15 15' together. From this construction it results that when the brakes are applied, as in the manner hereinbefore described, through a movement of the brake-rods 20, the result will be that the circumferential or rising movement of the brake-arms 15 15' will, through the rods 22', draw upon the short arm 54' of the bell-crank P, and thus rock the same downward upon the axis B, thereby causing the long arm 50' to draw or stretch out the rubber band S, as shown at the right-hand end of Fig. 2; and that when the application of the brakes is made through the medium of the rods 20' the circumferential or rising movement of the brake-arms 16 16' will, in like manner, through the rods 22, rock the bell-crank 50 downward on the axle A, and draw down or stretch out the rubber strap S. When either of these rubber straps is drawn out, the resilient power which they contain will be sufficient, if properly applied to the axle of the wheels, to impart thereto a rotative movement to start the car. In order that said bell-crank levers may be coupled to the axle to apply this power, the axle A is provided with a friction-wheel, A, fast upon it, to the surface of which wheel the bell-crank 50 is clamped by means of a dog, 60, which is weighted to properly clutch the surface of said wheel; and the axis B is in like manner provided with a friction-wheel, A', and the bell-crank 50' with a weighted dog, 60'. When, therefore, as before explained, the brakes are applied to the wheels by a movement of the rods 20, and the bell-crank 50' is drawn down to stretch out the rubber strap S', the said bell-crank will be strongly clutched to the axle B by means of the dog 60'. When the car has stopped, and the brakes are released from the strain exerted through the rods 20, the brakes will loosen their hold upon the wheels, the brake-shoes 10 10' dropping to the position shown in Fig. 3, and the brake-bars 30 31 releasing the brake-shoes 11 11' from their pressure. The resilient power of the rubber strap S will then be applied through the bell-crank P, dog 60', and friction-wheel W' to the axle B, and hence act to impart a rotative movement to the wheels D D' to start the car, the power being greatest at the beginning of such movement, and diminishing as the inertia of the car is overcome and the rubber strap shortens. When the car is stopped by the application of the brakes through the rods 20, the bell-crank 50' will in like manner stretch out the strap S and apply its power to the axle A to start the car.

It is to be observed that the first movement of the brake-arms operates to clamp the brakes to the wheels, and that it is when the rising movement is imparted to said arms by the wheels that the leverage of the said arms is applied to release the rods 22 or 22' to operate the starting-levers, the power of the wheels, and not that exerted through the rods 20 20', being transmitted to said brake-arms. It will be further observed that the structure is such that, no matter how suddenly or completely the brake is applied, there is provided in the rubber strap an elastic medium that will prevent any sudden jarring of the car, and that when the brakes are released this elastic power will be smoothly applied to start the car and produce no jerking movement. The structure is such that when one bell-crank is thus operated the other will remain motionless, for the reason that only the brake-arms at the forward end of the car, or that from which the brakes are applied, receives the circumferential movement that rocks the coacting bell-crank, and hence only that bell-crank is moved that is appropriately located to act as a starter. Of course, in cars adapted to run in one direction only, but one set of starting devices will be employed, and but one pair of brakes need in some cases be used. These improvements may be connected with cars when the brakes are applied by a hand-windlass or by steam or air apparatus. Although single and wide rubber straps S or S' are shown in connection with each pair of wheels and brakes, a duplex or multiplex arrangement of such straps, or narrow ones, may be employed. Although rubber straps are preferred, for the reason that great power may be obtained with but slight elongation of the strap, an arrangement of a spring or springs elongated or compressed by drawing upon a strap connected with them is to be understood as within this invention as an equivalent of said strap S or S'. When the brake mechanism is alone employed, each brake and brake-arm may move more independently of one another by omitting the rods 14 17. The dogs 60 60' and wheels W W' might have substituted for them a pawl-and-ratchet mechanism, or any other clutch may be employed.

What therefore is claimed is—

1. In a car-brake, the combination, with a brake-shoe hung from the axle by an arm recessed to embrace, slide, and swing upon the axle, of a chain or rod for causing the sliding movement of said arm, substantially as described.

2. In a car-brake mechanism, the combination, with the opposite wheels upon the same shaft, of brake-shoes, each hung from the axle by arms recessed to embrace, slide, and swing upon the axle, said arms being connected together, so as to cause the brakes to move in unison, by means of brace-rods, as 14 17, substantially as described.

3. A brake mechanism consisting of two pairs or sets of brake-shoes, each shoe carried by an arm that is recessed to move upon the axle, and brake-bars arranged between the brake-arms of the opposite sets of brake-shoes, substantially as described.

4. A car-starting device consisting of a rubber strap, a bell-crank attached to said strap and having means for clutching it to one axle, brake-arms swinging upon the other axle, and connecting-rods transmitting the movement of the brakes to the said bell-crank, substantially as described.

5. A car-starting mechanism consisting of brake-shoes and brake-arms constructed to swing upon one axle, a bell-crank swinging upon the other axle, connected to a rubber strap and having a device for clutching it to the shaft, said brake-arms and bell-crank being connected together so that the movement of the former is transmitted to the latter, substantially as described.

6. A car-starting mechanism consisting of two sets of brake-shoes and brake-arms, each set hung to swing upon one of the wheel-axles, a bell-crank hung to swing upon each axle, each bell-crank having means for clutching it to its axle, and a rubber strap attached to each bell-crank, the set of brake-arms upon one axle being connected with the bell-crank upon the other axle, whereby the application of the brakes to one set of wheels will operate the bell-crank upon the axle of the other set of wheels and stretch the rubber strap with which it is connected, so as to apply the power thereof in starting the car, substantially as described.

7. A car-starting mechanism consisting of two sets of brake-shoes and brake-arms, each set hung to swing upon one of the wheel-axles, brake-bars arranged to transmit the movement of one set of brakes to the other set, a bell-crank hung to swing upon each axle, means for clutching said bell-cranks to their respective axles, a rubber strap attached to each bell-crank, and rods connecting each set of brake-shoes and arms with the opposite bell-crank, whereby the simultaneous application of the brakes from either end of the car moves a bell-crank to stretch a rubber strap and provide a power that will start the car when the brakes are released, substantially as described.

In testimony whereof I have hereunto set my hand in the presence of two subscribing witnesses.

BROR F. BERGH.

Witnesses:
T. H. PALMER,
H. T. MUNSON.